United States Patent
Vander Sluis et al.

(10) Patent No.: US 7,264,295 B2
(45) Date of Patent: Sep. 4, 2007

(54) VEHICLE COCKPIT ATTACHMENT STRUCTURE WITH INTEGRATED PLASTIC COMPOSITE FUNCTIONAL MOLDED FEATURES

(75) Inventors: Daniel R. Vander Sluis, Plymouth, MI (US); James D. Caie, Canton, MI (US); Joseph A. Camilletti, III, Sterling Heights, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 8 days.

(21) Appl. No.: 11/189,402

(22) Filed: Jul. 26, 2005

(65) Prior Publication Data

US 2007/0024090 A1 Feb. 1, 2007

(51) Int. Cl.
*B62D 25/14* (2006.01)
(52) U.S. Cl. ...... 296/70; 296/72; 296/193.02; 180/90
(58) Field of Classification Search ........ 296/70, 296/72, 193.02; 180/90
See application file for complete search history.

(56) References Cited

U.S. PATENT DOCUMENTS

| | | | |
|---|---|---|---|
| 5,190,803 A | | 3/1993 | Goldbach et al. |
| 5,311,960 A | * | 5/1994 | Kukainis et al. ............ 180/90 |
| 5,354,114 A | | 10/1994 | Kelman et al. |
| 5,580,122 A | * | 12/1996 | Muehlhausen ......... 296/193.02 |
| 5,951,045 A | * | 9/1999 | Almefelt et al. ............ 280/748 |
| 6,152,489 A | | 11/2000 | Hedderly et al. |
| 6,273,495 B1 | * | 8/2001 | Haba et al. ............ 296/193.02 |
| 6,371,551 B1 | | 4/2002 | Hedderly |
| 6,378,934 B1 | | 4/2002 | Palazzolo et al. |
| 6,412,855 B1 | | 7/2002 | Cantineau et al. |
| 6,421,979 B1 | | 7/2002 | Fischer et al. |
| 6,447,041 B1 | | 9/2002 | Vandersluis et al. |
| 6,560,872 B2 | | 5/2003 | Morrison et al. |
| 6,601,902 B1 | | 8/2003 | Rahmstorf et al. |
| 6,644,722 B2 | * | 11/2003 | Cooper ................. 296/187.02 |
| 6,668,513 B2 | | 12/2003 | Roberts et al. |
| 6,676,202 B2 | | 1/2004 | Brancheriau |
| 6,688,680 B1 | * | 2/2004 | Cooper et al. ............. 296/208 |
| 6,705,671 B1 | | 3/2004 | Glovatsky et al. |
| 6,761,395 B2 | | 7/2004 | Charbonnel |
| 6,834,913 B2 | * | 12/2004 | Reed et al. ................ 296/208 |
| 6,877,787 B2 | | 4/2005 | Ito et al. |
| 6,942,910 B2 | * | 9/2005 | Roberts et al. ............ 428/35.8 |
| 2003/0122404 A1 | | 7/2003 | Duchez |
| 2004/0108744 A1 | * | 6/2004 | Scheib et al. ................ 296/70 |
| 2004/0197528 A1 | | 10/2004 | Roberts et al. |

* cited by examiner

*Primary Examiner*—Dennis H. Pedder
*Assistant Examiner*—Michael Hernandez
(74) *Attorney, Agent, or Firm*—Brinks Hofer Gilson & Lione

(57) ABSTRACT

A cockpit assembly generally includes a cast alloy backbone, an intermediate plastic support member, and an instrument panel. The cast alloy backbone extends laterally and defines attachment features. The intermediate support member provides structural support to the various devices of the cockpit assembly, and is connected to the backbone through molding of the plastic around the attachment features. The instrument panel is connected to the support member and defines an interior surface exposed to the passenger compartment of the vehicle.

19 Claims, 5 Drawing Sheets

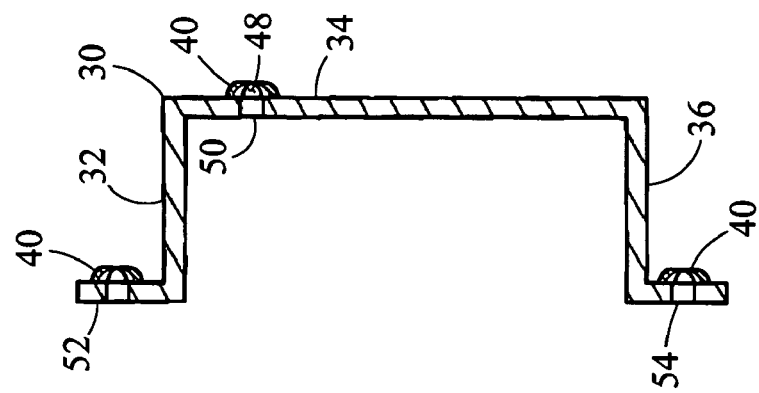
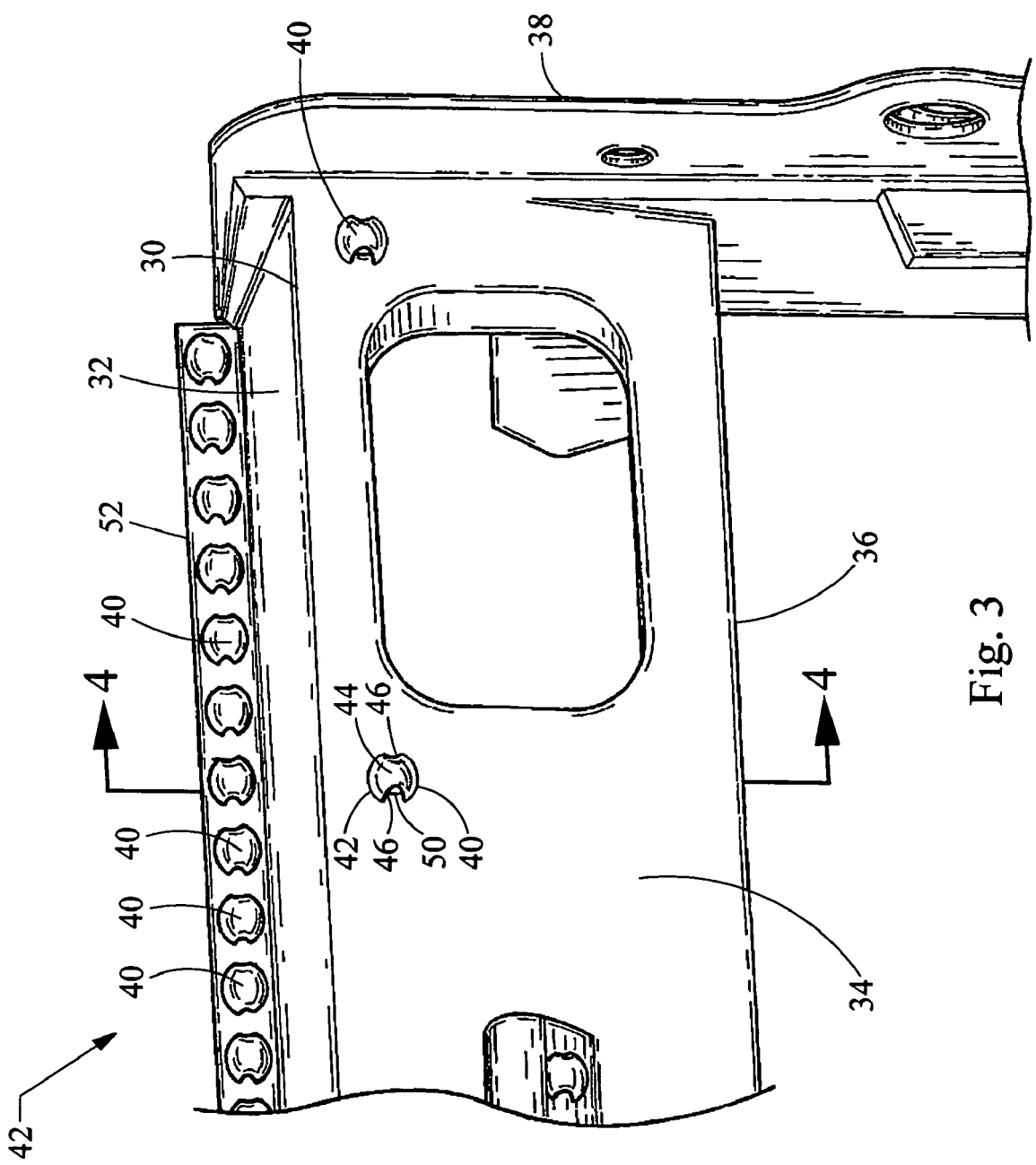

VEHICLE COCKPIT ATTACHMENT STRUCTURE WITH INTEGRATED PLASTIC COMPOSITE FUNCTIONAL MOLDED FEATURES

FIELD OF THE INVENTION

The present invention relates generally to a cockpit assembly for a motor vehicle, and more particularly relates to providing structural support for functional devices in a cockpit assembly.

BACKGROUND OF THE INVENTION

In a typical cockpit assembly for a motor vehicle, a metal cross-car beam is augmented with a plurality of structural extensions for supporting various functional devices within the cockpit assembly. Such functional devices in the cockpit assembly include center stack devices (i.e., informational, communication or entertainment devices), HVAC devices and related air handling structures, wire harnesses, airbags, an instrument cluster, glove boxes and the like. The structural support for such devices is provided by various metal extensions such as brackets, rods and other add-on structures which are used to mount these devices in the cockpit assembly. The cockpit assembly is closed off to the passenger compartment by an instrument panel. The panel is typically constructed of a soft and ductile plastic.

In today's electronic age, increasing numbers of electronic devices are desired in the cockpit or adjacent areas of the vehicle. Thus, these cockpit assemblies are subjected to often conflicting requirements. For example, it is desirable that the cockpit structure is lightweight and low-cost, while at the same time the structure must be robust enough and feature integral so that increasing numbers of electronics and other devices may be provided within the cockpit assembly. Current cockpit structures are physically and mechanically limited such that they meet only a certain subset of the expected requirements successfully.

Accordingly, there exists a need to provide a cockpit assembly which is lightweight and low cost while also sufficiently robust and feature integral to meet to the increasing demands for integrated devices.

BRIEF SUMMARY OF THE INVENTION

One embodiment of a cockpit assembly for a motor vehicle overcomes the above-noted limitations in accordance with the teachings of the present invention. The cockpit assembly generally includes a cast alloy backbone, an intermediate plastic support member, and an instrument panel. The cast alloy backbone extends laterally and defines a plurality of attachment buttons. The plurality of attachment buttons preferably include a first portion projecting away from a surface of the backbone and a second portion extending generally parallel to the surface of the backbone. The attachment button defines an interior space, to which access is provided through a pair of apertures formed into the attachment buttons. The intermediate support member provides structural support to the various devices of the cockpit assembly, and is connected to the backbone through molding of the plastic around the plurality of attachment buttons. The instrument panel is connected to the support member and defines an interior surface exposed to the passenger compartment of the vehicle.

Accordingly, it will be recognized that by separately molding an intermediate plastic support member directly to the backbone, the support member may be specially tailored for all of the different devices which are desired to be carried in the cockpit assembly. Further, the manufacture of the cockpit assembly is improved by permitting the intermediate support member to be integrally formed as a unit with the cast alloy backbone. Finally, the intermediate support member may be constructed of a plastic material having higher tensile strength and more rigidity than the typically weaker plastic material used to form the instrument panel, which is often desired to be more ductile and have better tactile feel.

According to more detailed aspects, the plastic material of the intermediate support member is molded through the pair of apertures and through the interior space. The surface of the backbone may further include a hole covered by an attachment button, and the plastic material of the support member will extend through this hole as well. The pair of apertures are preferably spaced on opposing sides of the attachment buttons. Preferably, the plurality of attachment buttons includes a series of attachment buttons aligned side-by-side and in close proximity to one another. In this manner, the pairs of apertures of the series of attachment buttons are aligned, and are preferably aligned along a lateral axis of the backbone. The backbone is preferably a cross-car beam, and preferably includes a flange having a series of attachment buttons aligned along the flange. Most preferably, the flange is an upturned flange on an upper portion of the backbone, and the backbone further includes a downturned flange on a lower portion of the backbone, which also includes a series of attachment buttons aligned along the downturned flange.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is an enlarged view, partially cut-away, of the backbone depicted in FIG. 1;

FIG. 4 is a cross-sectional view taken along line 4-4 in FIG. 3;

DETAILED DESCRIPTION OF THE INVENTION

Figure 1:
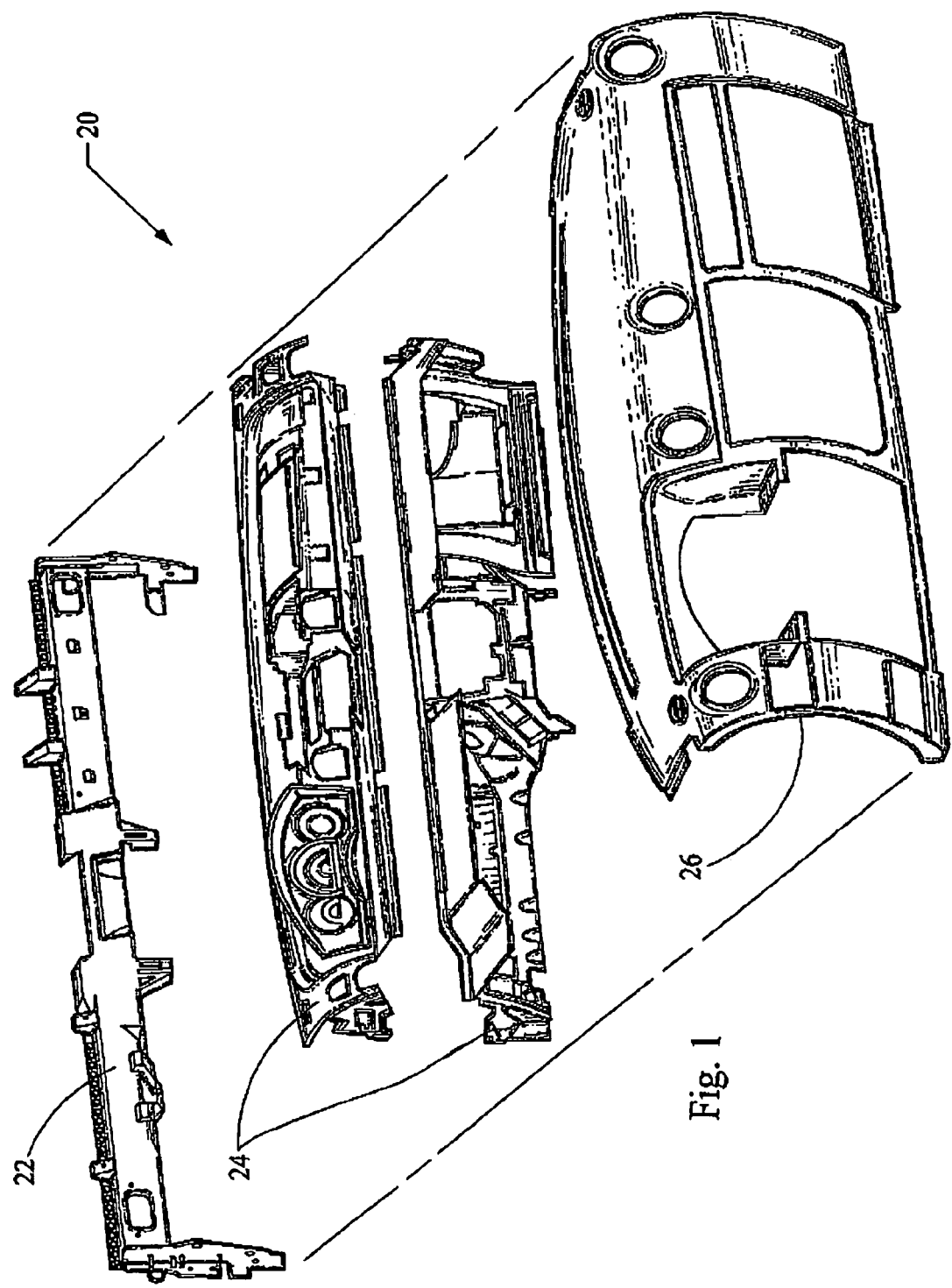
FIG. 1 depicts an exploded view of a cockpit assembly constructed in accordance with the teachings of the present invention.

Turning now to the figures, FIG. 1 depicts an exploded view of a cockpit assembly 20 for a motor vehicle (not shown) constructed in accordance with the teachings of the present invention. The cockpit assembly generally includes a backbone 22, an intermediate support member 24, and an instrument panel 26. The backbone 22 is preferably constructed of a cast alloy such as a magnesium alloy. In this manner, the backbone may be structured to include unique attachment features which permit injection molding of the intermediate support member 24 to the cast alloy backbone 22. Furthermore, the cockpit assembly 20 allows the intermediate support member to be constructed of a strong and durable plastic material, preferably selected from the group consisting of nylon, glass filled polypropylene, styrene, polycarbonate or blends thereof, such as ABS/PC. As such, the plastic material of the intermediate support member 24 generally has higher tensile strength and greater rigidity than the plastic material used for the instrument panel 26. That is, the instrument panel 26 may be constructed of a plastic material that is typically used for such panels, which is typically softer and more ductile to be sensitive to the touch, and is typically a polypropylene, or any suitable thermoplastic material.

Figure 2:
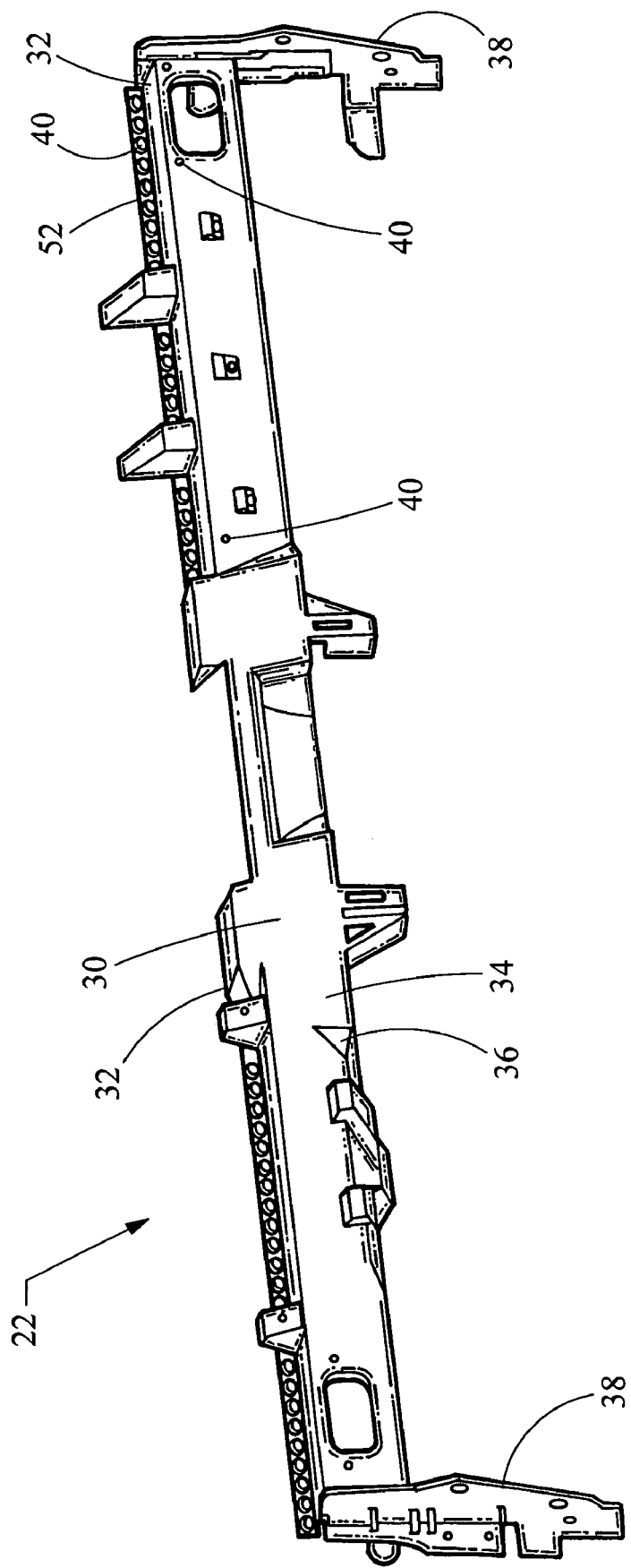
FIG. 2 is a perspective view of a backbone forming a portion of the cockpit assembly depicted in FIG. 1.

Turning to FIGS. 2-4, the backbone 22 will now be described. The backbone 22 generally comprises a beam 30 which extends along an axis 32 which extends laterally relative to a longitudinal axis of the vehicle. As best seen in FIG. 4, the beam 30 may comprise a C-shaped channel having an upper wall 32, a sidewall 34 and a lower wall 36. The beam 30 preferably extends from one side of the vehicle to the other side of the vehicle, and mounting plates 38 are thus formed at the ends of the beam 30 for interconnection with other structural members of the vehicle, as is known in the art.

As noted above, unique attachment features may be directly cast into the backbone 22, as will now be described with reference to FIGS. 3 and 4. A preferred construction includes an attachment button 40 which includes a first portion 42 projecting away from a surface (such as sidewall 34) of the backbone 22, and a second portion extending laterally to the same surface of the backbone 22. It can be seen in FIG. 4 that the second portion 44 is given a curved shape, although flat or different non-linear surfaces may be used to close off the first portion 42 at a location speed from the surface of the backbone 22. Likewise, the first and second portions 42, 44 could be combined into a single curved surface, and the button 40 may project away from or in to (i.e. indented, a depression) the backbone surface. The attachment buttons 40 further include a pair of apertures 46 formed therein which provide access to the interior space 48 defined between the attachment button 40 and the surface of the backbone structure 22 (i.e., the surface of sidewall 34). The apertures 46 may be formed only in the first portion 42 of the attachment button 40, although it may also be formed in a portion of the second portion 44 (or only the second portion 44), such as is shown in the figures. It will also be recognized that the attachment button 40 may cover a hole 50 formed into the sidewall 34 or other surface of the backbone structure 22 from which the attachment button 40 projects. In this manner, the plastic material of the intermediate support member 24, when in its molten state, may flow through the apertures 46 and into the interior space 48, as well as through the hole 50, where it will solidify to provide a secure interconnection between the backbone 22 and support member 24.

As shown in FIG. 3, the buttons 40 may be formed on the sidewall 34 of the beam 30, although it will be recognized that the attachment buttons 40 may also be formed on the upper wall 32 or the lower wall 36 as desired. A plurality of attachment buttons 40 are formed along the length of the backbone 22 and its beam 30. Most preferably, the backbone 22 and its beam 30 are constructed to include an upturned flange 52 and a downturned flange 54 sized specifically to receive a series of attachment buttons 40. In particular, the series of attachment buttons 40 are preferably positioned in close proximity to one another, which herein means the attachment buttons 40 are with a distance 3×D of each other, where D equals the outer diameter of a button 40. The series of attachment buttons 40 are also preferably aligned along the longitudinal axis along the lateral axis 32 of the beam 30. It can also be seen that the pair of apertures 46 are positioned on opposing sides of the attachment buttons 40, such that when formed in a series in close proximity, the pairs of apertures 46 of all the attachment buttons 40 are aligned. As such, adjacent attachment buttons 40 have apertures 46 which are also adjacent each other. This structure results in an elongated strip of plastic material of the intermediate support member 24 extending completely through all of the attachment buttons 40 in the series (i.e., their holes 46 and interior spaces 48). In this manner, an extremely secure interconnection may be formed between the backbone 22 and the intermediate support member 24.

Figure 5:
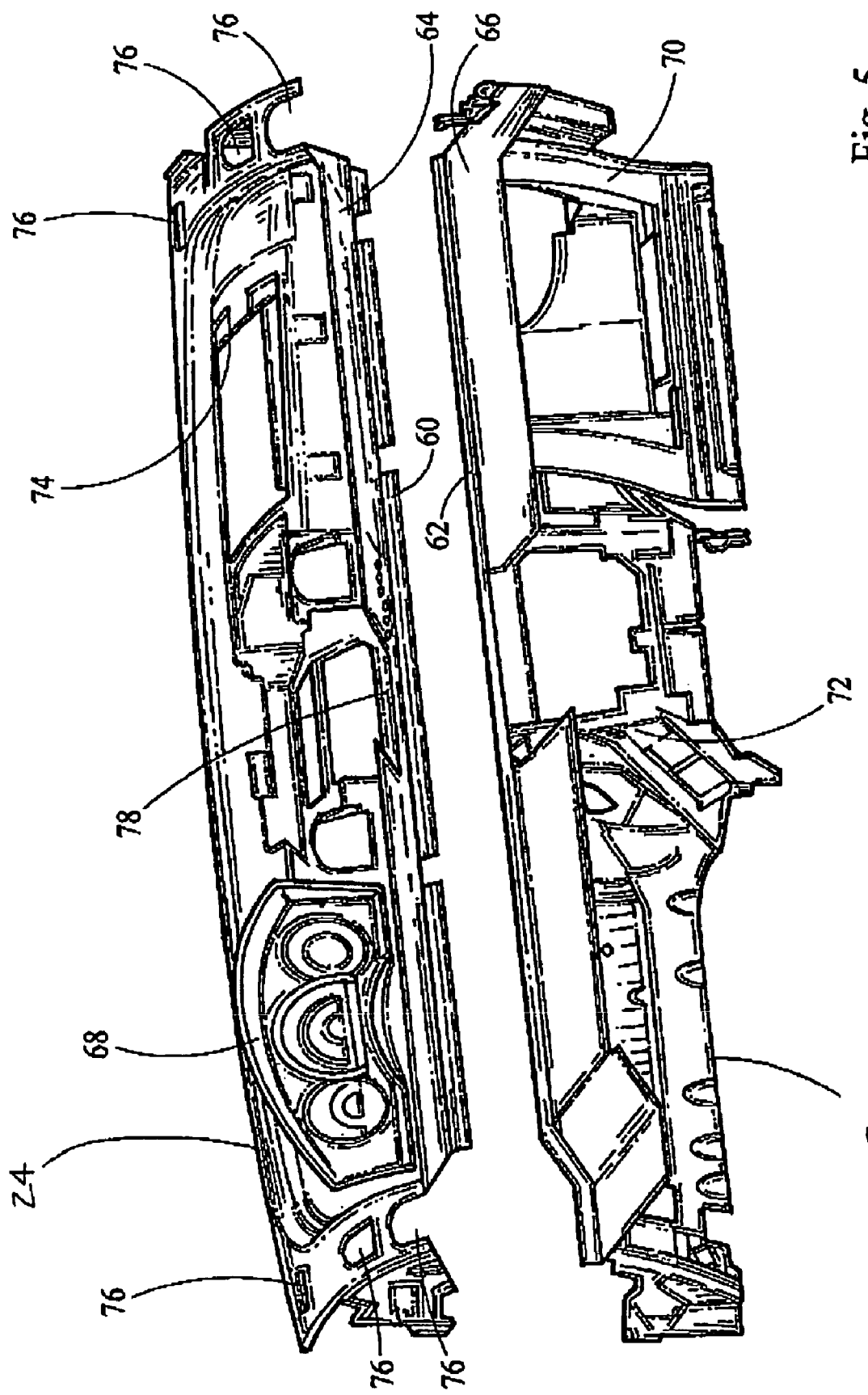
FIG. 5 is a perspective view of a support structure forming a portion of the cockpit assembly depicted in FIG. 1.

Turning now to FIG. 5, it will be recognized that the intermediate support member 24 may be constructed out of a plastic material that is injected molded onto the backbone 22, and in particular around the attachment buttons 40. As previously noted, the intermediate support member 24 will include a strip of material 60 which extends through the series of attachment buttons 40 formed on the upturned flange 52, and likewise will have a lower strip of material 62 which extends through and around the series of attachment buttons 40 formed on the downturned flange 54. As such, the majority of the width of the intermediate support member 24 is supported by the backbone 22, and the backbone 22 splits the support member 24 into upper and lower halves, which may be separately formed, but can be interconnected. It will also be seen that the intermediate support member 24 is connected to the cast alloy backbone 22 and extends generally rearwardly therefrom towards the passenger compartment of the vehicle.

A pair of support plates 64,66 project rearwardly from the attachment strips 60,62 (respectively) and provide a surface from which various functional support structures may be formed. That is, by allowing the intermediate support member 24 to be formed of a plastic material, unique support features may be molded directly into the support structure 24 for specific electronic or other functional devices. For example, the intermediate support member 24 may include an instrument cluster support structure 68 that is ready for receipt of the cluster instruments. Likewise, a glove box support structure 70 may be integrally formed. A gear shifter or support structure 72 may likewise be formed. A support structure for an airbag assembly 74 may also be formed integrally and unitarily in the support member 24. Likewise, a plurality of openings 76 may be formed for receipt of various air handling ducts from the HVAC system. Still further, structural support 78 for a center stack structure may be provided, the center stack structure generally including informational, communication and entertainment devices such as radios, CD players, navigation equipment and entertainment equipment. Likewise, human machine interfaces for these devices as well as other devices (such as the HVAC system) may also be provided within the center stack structure. It will be recognized by those skilled in the art that numerous structural support features may be provided for various devices desired to be contained within the cockpit assembly 20, thereby responding to the demand for increasing numbers of devices in the cockpit as electronic and other automotive technology continues to develop.

Figure 6:
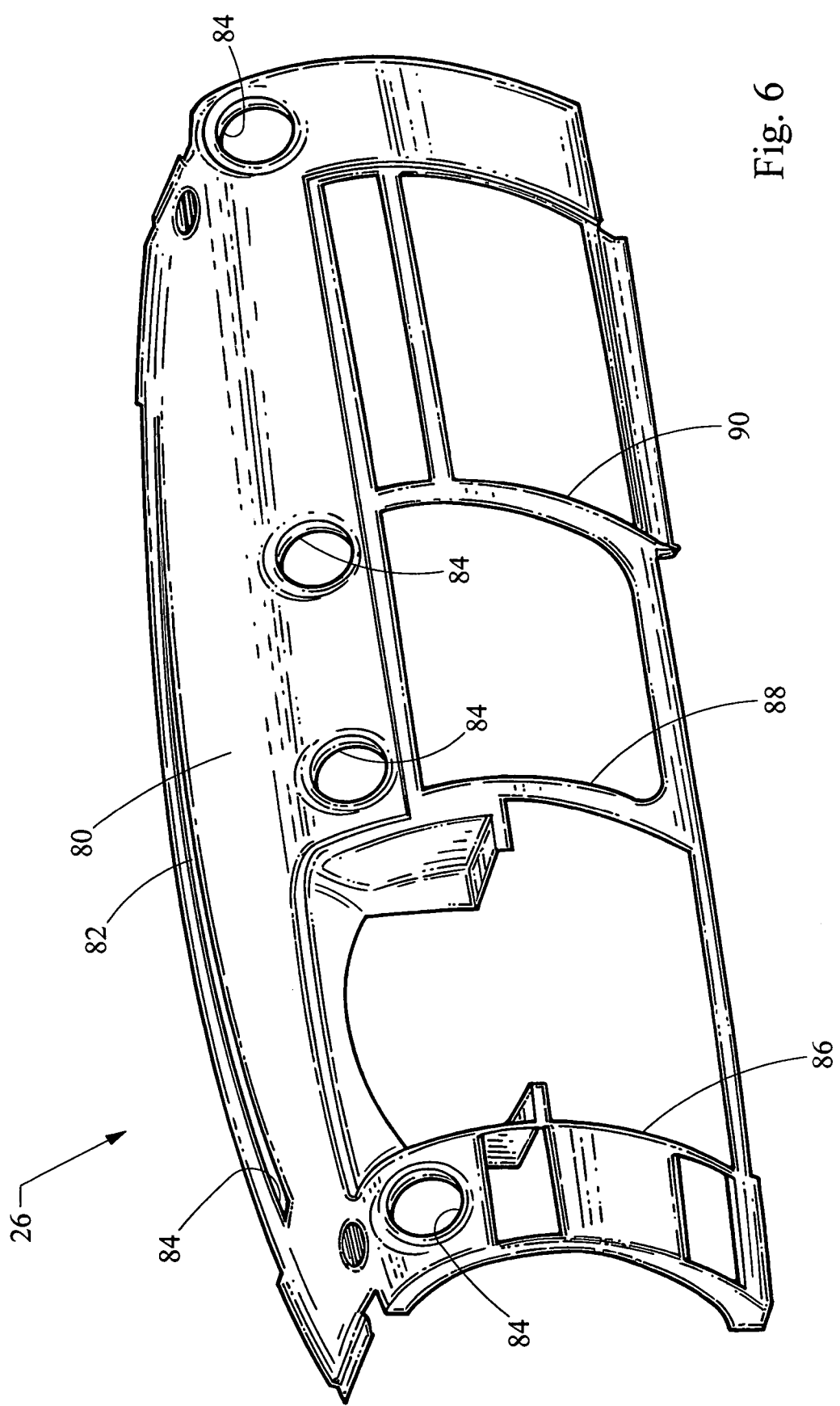
FIG. 6 is a perspective view of an instrument panel forming a portion of the cockpit assembly depicted in FIG. 1.

FIG. 6 depicts the instrument panel 26 which is attached to the rear side of the intermediate support structure 24. The instrument panel 26 generally includes a substrate 80 having an outer surface 82 which forms the class "A" interior surface exposed to the passenger compartment of the vehicle. It will be recognized that the instrument panel 26 and substrate 80 includes various openings such as openings 84 for an air handling interface, opening 86 for the steering column and instrument panel, opening 88 for the center stack structure, opening 90 for the glove box compartment, and the like. The instrument panel 26 and substrate 82 may comprise a laminate structure, and is preferably formed of a recyclable and lower-cost material such as polypropylene, or other thermoplastics as is known in the art. The instrument panel 26 may be attached to either the intermediate support structure 24 or even the backbone 22, preferably by tacking, adhesives, rivets, heat deformation or any other well known connection methods and structures.

Accordingly, it will be recognized by those skilled in the art that the unique cockpit assembly 20 of the present invention provides for a cast alloy backbone 22, permitting unique attachment features to be formed such as the buttons 40 previously discussed. This, in turn, permits use of an intermediate plastic support structure 24 that can be molded and specifically designed for various configurations of functional devices to be housed within the cockpit assembly 20. The plastic intermediate support structure 24 thus results in reduced manufacturing time and cost, as well as a reduction in weight. Further, by separating the intermediate support structure 24 from the instrument panel 26, different materials for the support structure 24 and instrument panel 26 may be utilized, such as stronger and more rigid materials for the intermediate support structure 24 while softer and more visually and tactilely acceptable material (preferably lower-cost materials) may be employed for the instrument panel 26.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A cockpit assembly for a motor vehicle defining a longitudinal axis, the cockpit assembly including various devices, the cockpit assembly comprising:
    a cast alloy backbone extending laterally relative to the longitudinal axis, the backbone defining a plurality of attachment buttons;
    at least one of the plurality of attachment buttons including a first portion projecting away from a surface of the backbone and a second portion extending laterally relative to the surface of the backbone to define an interior space, and further including a pair of apertures formed into the first portion of the attachment buttons to provide access to the interior space;
    an intermediate plastic support member providing structural support to the devices, the support member connected to the backbone through molding of the plastic material of the support member around the plurality of attachment buttons; and
    an instrument panel connected to the support member and defining an interior surface exposed to a passenger compartment of the vehicle.

2. The cockpit assembly of claim 1, wherein the plastic material of the support member extends through the pair of apertures and the interior space.

3. The cockpit assembly of claim 1, wherein the surface of the backbone includes a hole covered by the at least one of the plurality of attachment buttons, and wherein the plastic material of the support member extends through the hole.

4. The cockpit assembly of claim 1, wherein the first portion of the at least one of the plurality of attachment buttons projects away from the surface of the backbone at an angle.

5. The cockpit assembly of claim 1, wherein the at least one of the plurality of attachment buttons is generally circular.

6. The cockpit assembly of claim 1, wherein the pair of apertures are spaced on opposing sides of the at least one of the plurality of attachment buttons.

7. The cockpit assembly of claim 1, wherein the plurality of attachment buttons includes a series of attachment buttons aligned side-by-side in close proximity to one another.

8. The cockpit assembly of claim 7, wherein the pairs of apertures of the series of attachment buttons face laterally and are aligned.

9. The cockpit assembly of claim 7, wherein the pair of apertures are aligned along a lateral axis defined by the backbone.

10. The cockpit assembly of claim 8, wherein molding of the support structure around the series of attachment buttons results in the support structure including strip extending through the series of attachment buttons.

11. The cockpit assembly of claim 1, wherein the backbone is a cross-car beam.

12. The cockpit assembly of claim 1, wherein the backbone includes a flange having a series of attachment buttons aligned along the flange.

13. The cockpit assembly of claim 12, wherein the flange is an upturned flange on an upper portion of the backbone, and further comprising a downturned flange on a lower portion of the backbone, the downturned flange having a series of attachment buttons aligned along the flange.

14. A cockpit assembly for a motor vehicle defining a longitudinal axis, the cockpit assembly comprising:
    a cast alloy backbone extending laterally relative to the longitudinal axis,
    an intermediate plastic support member providing structural support to a plurality of functional devices of the cockpit assembly, the support member defining a plurality of support structures shaped to directly mount the plurality of functional devices to the support member, the support member connected to the backbone and extending rearwardly therefrom towards the passenger compartment;
    a plastic instrument panel connected to the support member and defining an outer surface exposed to the interior of the vehicle;
    the plastic material of the support member having a higher tensile strength than the plastic material of the instrument panel, and
    the backbone defining a plurality of attachment buttons, the support member being molded around the plurality of attachment buttons.

15. The cockpit assembly of claim 14, wherein the plastic material of the support member is more rigid than the plastic material of the instrument panel.

16. The cockpit assembly of claim 14, wherein the plastic material of the support structure is selected from the group consisting of nylon, glass filled polypropylene, styrene, polycarbonate or blends thereof, such as ABS/PC.

17. The cockpit assembly of claim 14, wherein at least one of the plurality of attachment buttons includes a first portion projecting away from a surface of the backbone and a second portion extending generally parallel to the surface of the backbone to define an interior space, and further includes a pair of apertures formed into the attachment buttons providing access to the interior space.

18. The cockpit assembly of claim 14, wherein the entire intermediate plastic support structure is unitarily formed.

19. The cockpit assembly of claim 14, wherein the functional devices include at least one of a radio, CD player, navigation screen, entertainment screen, instrument cluster instruments, glove box, and gear shifter.

* * * * *